J. N. BODINE.
Mold for Glass Jars.

No. 215,869. Patented May 27, 1879.

Witnesses:
W. B. Masson
H. H. Bliss

Inventor:
J. Nixon Bodine
by H. H. Doubleday
atty.

UNITED STATES PATENT OFFICE.

J. NIXON BODINE, OF BRIDGETON, NEW JERSEY, ASSIGNOR TO COHANSEY GLASS COMPANY, OF PHILADELPHIA, PENNSYLVANIA.

IMPROVEMENT IN MOLDS FOR GLASS JARS.

Specification forming part of Letters Patent No. 215,869, dated May 27, 1879; application filed March 7, 1879.

*To all whom it may concern:*

Be it known that I, J. NIXON BODINE, of Bridgeton, in the county of Cumberland and State of New Jersey, have invented certain new and useful Improvements in Molds for Glass Jars; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Heretofore, in the manufacture of threaded-neck jars, it has been necessary to employ a mold, to the top of which a cap was attached adapted to receive the glass, which might be blown from the mold by the air therein contained. After the operation of molding was completed, the glass thus blown over was removed by clipping it off by hand. This necessitates a considerable expense for clipping off the "blow-over cap"—a waste of about seventeen per cent. of the glass—and a waste by breakage of articles in the process of "clipping," together greatly increasing the cost.

The object of this invention is to produce a mold for glass jars with which a full thread can be formed without requiring the blow-over cap now necessary. This object I attain by forming the mold with a series of small apertures or vents which lead from the screw-thread recesses to the outside of the mold, and through which the confined air escapes, and permits the glass to fill entirely the thread-recess without blowing the glass over the top of the mold. Thus I avoid the necessity of the blow-over cap, and prevent the waste of glass and time required when the usual molds are used.

Figure 1:
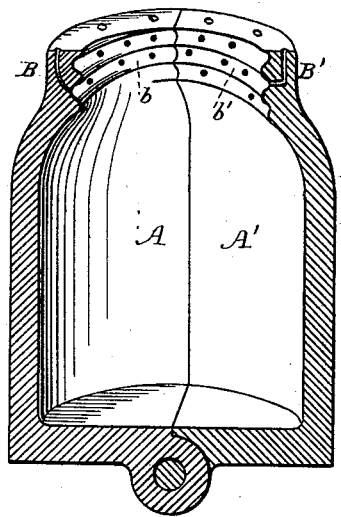
Figure 2:
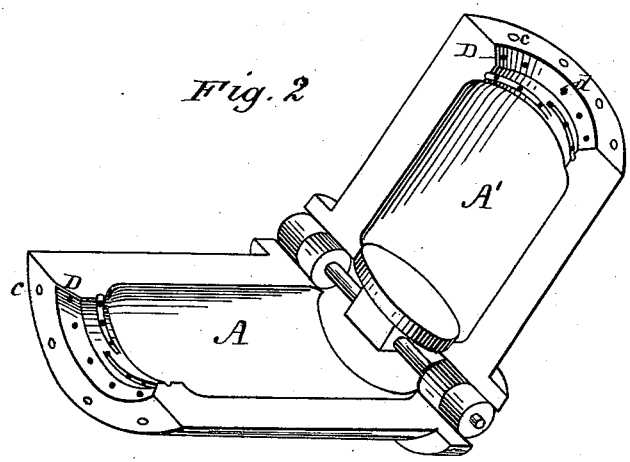

Figure 1 is a section of a jar-mold constructed in my improved manner. Fig. 2 is a perspective view of a somewhat different style of mold.

In the drawings, A represents one part of the body of the mold, and A' the other part of the same. B B' represent the parts of the mold which form the neck. $b\ b$ are inclined or screw-thread recesses formed in the neck of the mold, whereinto the glass passes to produce the threads that hold the cap on the jar.

When a blow-over cap is used it is secured to the top of the mold by means of screws or bolts at $c\ c\ c$.

When the glass is inserted into the molds it is met by the air in the recesses that form the threads, and the air prevents it from filling said recesses, and forces it over the top of the mold into the cap. This action prevents the forming of full and sharply-defined threads, and also necessitates the labor of removing from the top of the jar the glass that is blown over and that adheres to the said top, which glass is, of course, wasted. I obviate this serious difficulty by forming small apertures $a\ a\ a$ in the mold, which communicate with the thread-recesses $b\ b$, and with the open air through the mold, and act as vents for the air contained in said recesses. When these vent-holes are used the glass enters the recesses $b\ b$ freely without being forced back by the air, and fills them entirely full, thus producing complete and clearly-defined threads in the jar.

I prefer to so form the vents that the escape-orifice shall be on an inclined lip, D, of the mold, as shown at $d\ d$, Fig. 2.

I am aware that molds have been largely used with recesses formed in the contiguous faces of the two parts of the mold; but it is well known that molds of such character do not obviate the necessity of the blow-over cap and of chipping off the top.

I am also aware that molds adapted to form letters and other characters on the face of vessels, at a point considerably below the mouth of the mold, have been provided with apertures communicating with said letters or characters, to produce a clear definition of parts; but the molds for jars heretofore constructed and provided with vents have been made in two parts only, and it is expressly stated in the specification of the patent describing such mold that the vents will not permit the air to escape from between the glass and the mold in the thread unless the groove be deeper and sharper than it is desired that the thread shall be, and that a blow-over cap is used upon the mold thus constructed.

It is evident that in making jars in molds as heretofore constructed the form and external diameter of the thread must depend upon the extent to which the glass is made to conform to the shape and depth of the grooves; but by the employment of my invention I secure a great uniformity in the thread, because I make the grooves of the exact form and size that I want the completed thread to be, and cause the glass to conform accurately to the grooves—a mode of operation and result not heretofore contemplated, so far as I am aware; and so far as my knowledge extends I am the first to provide a jar-mold with a series of vents through the body of the mold communicating with the thread-recesses at or near the top of the mold so constructed as to obviate the necessity of a blow-over cap.

What I claim is—

A glass-jar mold having thread-recesses at the upper end, provided with a series of vent-holes through the body of the mold communicating with said recesses, whereby the glass is permitted to enter fully the thread-recesses, and the blowing over of the glass is prevented.

In testimony that I claim the foregoing as my own I affix my signature in presence of two witnesses.

J. NIXON BODINE.

Witnesses:
I. BOYD NIXON,
W. H. CARLL.